United States Patent
Kodama et al.

(10) Patent No.: US 6,648,312 B2
(45) Date of Patent: Nov. 18, 2003

(54) LIQUID-SEALED ANTIVIBRATION DEVICE

(75) Inventors: Yosei Kodama, Osaka (JP); Yukio Takashima, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/980,903

(22) PCT Filed: Apr. 20, 2001

(86) PCT No.: PCT/JP01/03421
§ 371 (c)(1),
(2), (4) Date: Dec. 3, 2001

(87) PCT Pub. No.: WO01/94809
PCT Pub. Date: Dec. 13, 2001

(65) Prior Publication Data
US 2002/0158391 A1 Oct. 31, 2002

(30) Foreign Application Priority Data
Jun. 2, 2000 (JP) ......................... 2000-165976

(51) Int. Cl.⁷ ................................. F16F 13/00
(52) U.S. Cl. ................................. 267/140.13
(58) Field of Search ................ 267/140.11, 140.13, 267/140.14, 219

(56) References Cited

U.S. PATENT DOCUMENTS

| | | | |
|---|---|---|---|
| 4,651,980 A | * 3/1987 | Morita et al. | 267/140.13 |
| 5,240,233 A | * 8/1993 | Kato et al. | 267/140.13 |
| 5,499,799 A | 3/1996 | Kojima | |
| 5,560,592 A | * 10/1996 | Shimoda et al. | 267/140.13 |
| 5,988,611 A | * 11/1999 | Takashima et al. | 267/140.13 |
| 6,082,718 A | 7/2000 | Yamada et al. | |
| 2002/0135114 A1 | * 9/2002 | Takashima et al. | 267/140.13 |

FOREIGN PATENT DOCUMENTS

| | | |
|---|---|---|
| EP | 0 957 284 A1 | 11/1999 |
| JP | 04 321833 | 11/1992 |
| JP | 07 077234 | 3/1995 |
| JP | 8-4823 | 1/1996 |
| JP | 10 009333 | 1/1998 |
| WO | WO 01 94809 | 12/2001 |

* cited by examiner

*Primary Examiner*—Jack Lavinder
*Assistant Examiner*—Bradley T. King
(74) *Attorney, Agent, or Firm*—Knobbe, Martens, Olson & Bear, LLP

(57) ABSTRACT

In a hydraulic antivibration device for use in supporting a vibratory body like an automobile engine, the invention enables it to enhance the dimensional precision of an orifice for shake vibration, to decrease the dispersion in characteristics, and to reduce the dynamic spring rate in a high frequency region thereby reducing noise such as muffled sound. Its expedient is in that a main liquid chamber (6) and a first subsidiary liquid chamber (7) are mutually brought into communication through a first orifice (8), a partition element (10) comprises a partition plate member (11) including an elastic membrane (12) and an orifice member (13), the first orifice (8) is formed by outer circumferences of the orifice member and partition plate member and a cylindrical rubber portion (4a) linking to a diaphragm, a space enclosed by a central plate section (13a) of the orifice member and the elastic membrane (12) is formed as a second subsidiary liquid chamber (15), and an opening as a second orifice (16) for muffled sound communicating from the first (7) to the second liquid chamber (15) is formed in the central plate section (13a).

4 Claims, 3 Drawing Sheets

LIQUID-SEALED ANTIVIBRATION DEVICE

This application is the U.S. National Phase under 35 U.S.C. §371 of International Application PCT/JP01/03421, filed Apr. 20, 2001, which claims priority to Japanese Patent Application No. 2000-165976, filed Jun. 2, 2000. The International Application was not published under PCT Article 21(2) in English.

TECHNICAL FIELD

This invention relates to a liquid-sealed antivibration device used for supporting a bivratory body such as an automobile engine in a vibration-proof manner.

BACKGROUND ART

Heretofore as a mount for supporting an automobile engine or any other vibratory body so as not to transmit its vibrations to the vehicle body or the like there have been known liquid-sealed type antivibration devices, wherein a liquid is sealed within a main body provided with a vibration-isolating base made of rubber elastomer.

For instance, JP Patent Publication 7-77234 (1995) A discloses a liquid-sealed antivibration device, in which a vibration-isolating base made of rubber elastomer and a diaphragm of rubber membrane are respectively attached hermetically to one opening and the other opening of a cylindrical main body fitting, an interior room enclosed by them is sealed with a liquid, a partition member having at its outer circumference an orifice is arranged between the vibration-isolating base and the diaphragm to compart into two upper and lower chambers, both liquid chambers being put into communication with each other through the orifice.

This liquid-sealed antivibration device is used by connecting a boss fitting, which is secured to the axial center of the vibration-isolating base, to a vibration source side and connecting the cylindrical main body fitting to a support side. And it is adapted to exhibit a vibration damping function and a vibration isolating fuction by reason of a liquid fluidization effect between both liquid chambers due to the orifice and a vibration absorbing effect due to the vibration-isolating base. Usually in order that the aforesaid orifice may exhibit an effective vibration damping function in a vibrational frequency region of shake vibration (10~15 Hz), its sectional area is determined and set.

With such a liquid-sealed antivibration device, an important requisite for obtaining stabilized reliable product characteristics with no dispersion is that the sectional area of an orifice adapted to shake vibration be set to conform to a desired dimension.

However the partition member of the antivibration device as disclosed above is prepared by press forming one steel plate to form a recessed channel at its outer circumferential part, and press fitted in the cylindrical main body fitting, whereby the orifice is formed between it and the inner peripheral surface of the main body fitting. Because of this, the dimensional precision of the aforesaid sectional area is not so high that a dispersion in characteristics of product is liable to occur.

The foregoing partition member was further fitted at its central area with an elastic membrane by vulcanization adhesive means and the reduction in dynamic spring rate was owed to one of the orifices (for shake vibration) and the aforesaid elastic membrane, and yet it was difficult to obtain a reduction effect in dynamic spring rate of vibrations generating a muffled sound in a relatively high frequency region (100 to 200 Hz).

In view of the aforementioned problems this invention has been made and is contemplated providing a liquid-sealed antivibration device with which it is possible to enhance the dimensional precision of the orifice at the outer peripheral portion corresponding to shake vibration, to reduce the dispersion in characteristics, and to lower the dynamic spring rate in a high frequency region and which is excellent also in reduction effect of noise such as a muffled sound or the like.

DISCLOSURE OF THE INVENTION

The liquid-sealed antivibration device of this invention is composed of an open bottom type of cylindrical main body fitting assuming a generally cup shape and having an open top, a boss fitting arranged inboard of the main body fitting in its axial center part, a vibration-isolating base of rubber elastomer interconnecting a lower part of the main body fitting and the boss fitting so as to close the bottom opening, a diaphragm of rubber membrane connected to the cylindrical main body fitting at its upper extremity so as to cover the open top, an interior room enclosed by these elements and sealed with a liquid, and a partition element arranged between the vibration-isolating base and the diaphragm to compart the interior room into a main liquid chamber on the boss fitting side and a first subsidiary chamber on the diaphragm side, both chambers communicating through an orifice with each other. And the device is characterized in that the partition element comprises a partition plate member including an elastic membrane at its central part and an orifice member disposed on the first subsidiary chamber side so as to contact with a peripheral edge portion of the elastic membrane in an opposing manner; a first orifice of a generally ring shape is formed by the orifice member, an outer peripheral portion of the partition plate member and a cylindrical rubber portion linking to the diaphragm; a space enclosed by a central plate section of the orifice member and a top surface of the elastic membrane is formed as a second subsidiary liquid chamber; the central plate section of the orifice member is formed with an opening as a second orifice for a muffled sound communicating from the first subsidiary chamber to the second subsidiary chamber.

Since the second orifice for a muffled sound on the first subsidiary chamber side as well as the first orifice at the outer periphery corresponsing to shake vibration are thus provided, it follows that the dynamic spring rate also in a higher frequency region (100~200 Hz) in comparison with the conventional device can be reduced. Accordingly it is possible to perform the vibration damping effectively in a wider frequency range thereby to enhance the effect of inhibiting noises. Furthermore on account of the construction that the first orifice is formed by the partition plate member and the orifice member, a formed or molded material can be utilized easily to either of them, so that it is possible to enhance the dimensional precision of the sectional area of the orifices and to reduce the dispersion in characteristics.

In the aforesaid liquid-sealed antivibration device, it is preferred that the opening as the second orifice, which the central plate section of the orifice member has, be at an opposite side to and made eccentric to the position of a communication part from the first orifice to the first subsidiary chamber. By this constitution it is possible to avoid mutual interference of both first and second orifices and further to stabilize the characteristics. In addition, even if the central portion of the diaphragm abuts on the central plate section of the orifice member when the first subsidiary chamber is contracted under diminished pressure, the second orifice is never choked.

In the preceding liquid-sealed antivibration device it is preferred that the partition plate member of the partition element be made of a metal plate by press forming, which is adhered, at its central opening part, with an elastic membrane such as rubber by vulcanization and that the orifice member be composed of a formed or molded body, e.g., of metal such as aluminum or its alloy, ceramic material or synthetic resin. By that constitution, it is possible to enhance the dimensional precision of the orifices.

Alternatively in the aforesaid liquid-sealed antivibration device, it is possible to construct so that the diaphragm is adhered by vulcanization to a cylindrical member fastened to the upper extremity at the open top of the cylindrical main body fitting; the cylindrical rubber portion integral with the diaphragm is fitted in an inner periphery of the cylindrical member; the orifice member and the partition plate member of the partition element are fitted in the inner periphery of the cylindrical rubber portion to form the first orifice. Thereby the bonding strength of the diaphragm can be enhanced.

Further, the aforementioned first orifice can be generally ring-shaped such that its circumferential path enclosed by outer circumferences of the partition plate member and orifice member and the cylindrical rubber portion is partly closed by a blocking wall portion, the blocking wall portion comprising a part of the orifice member and a rubber portion adhered by vulcanization to the partition plate member.

The liquid-sealed antivibration device as described above is used, with the boss fitting coupled to a vibration source member such as engine while with the cylindrical main body fitting coupled to a support side member such as a vehicle body.

BEST MODE OF CARRYING OUT THE INVENTION

The working forms of the invention will be described in greater detail by way of example with reference to the drawings.

Figure 1:
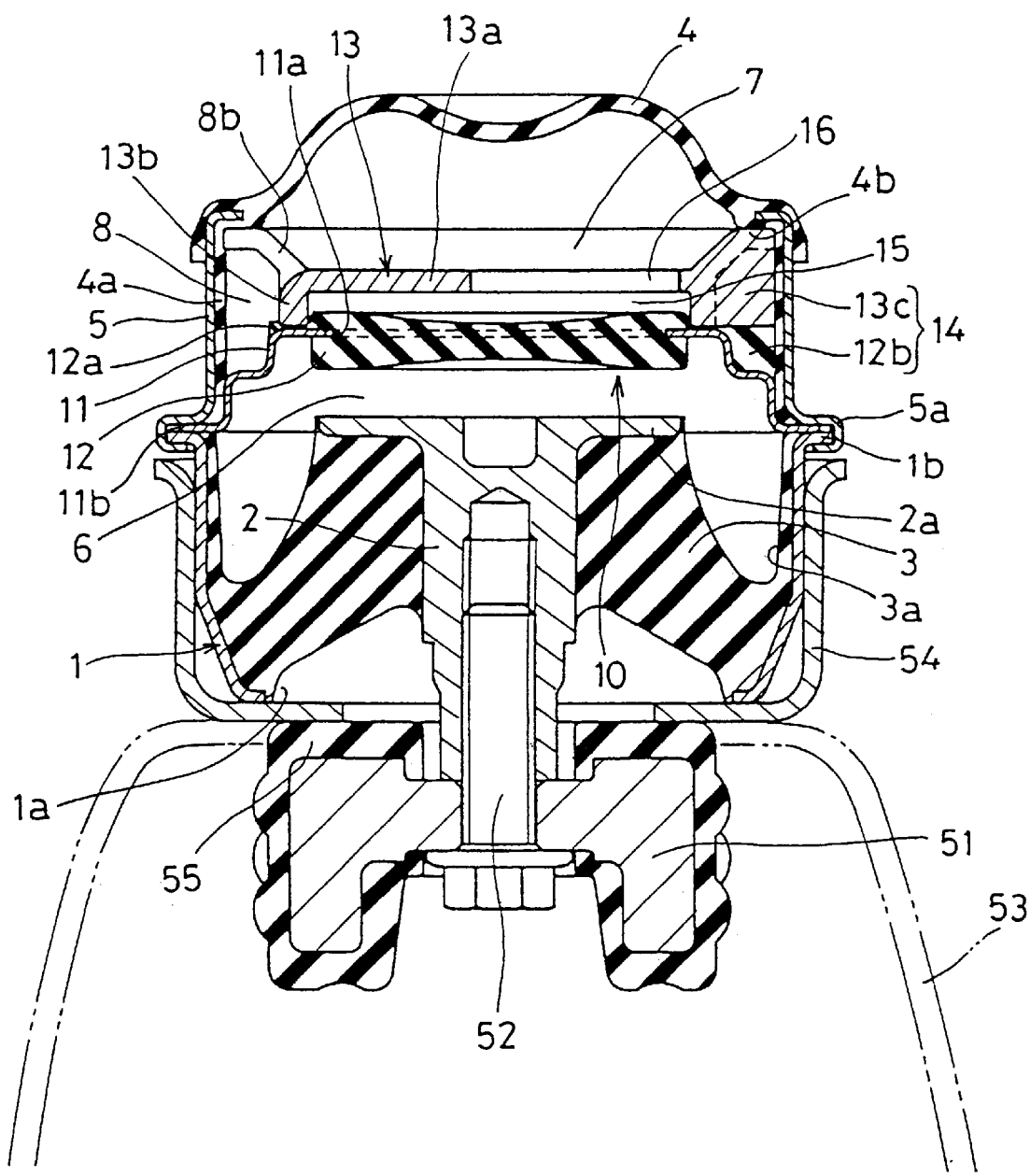
FIG. 1 is a sectional view of a liquid-sealed antivibration device pertaining to this invention.
Figure 2:
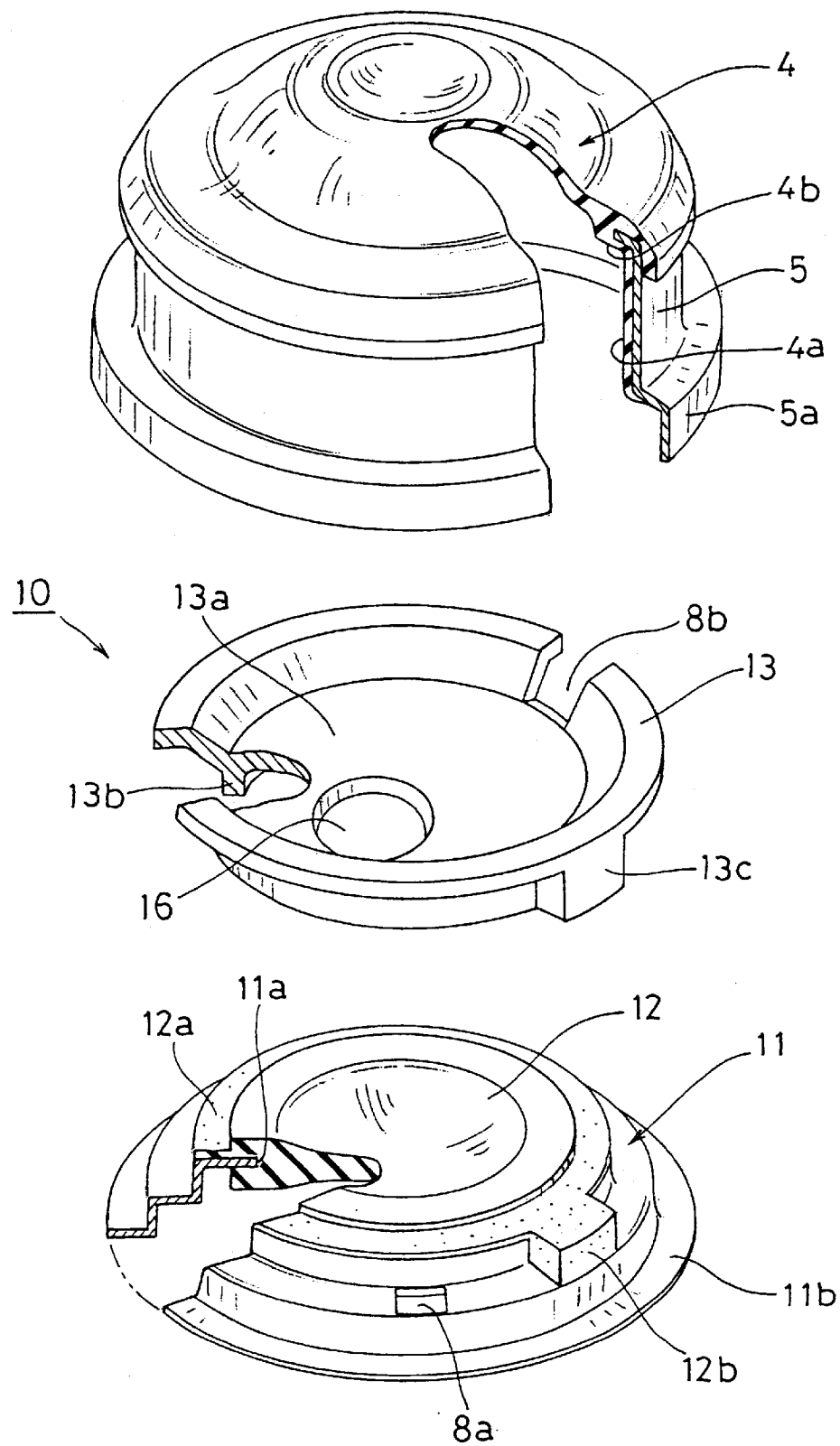
FIG. 2 is a partially cutaway exploded view, in perspective, showing a diaphragm and a partition element in FIG. 1.
Figure 3:
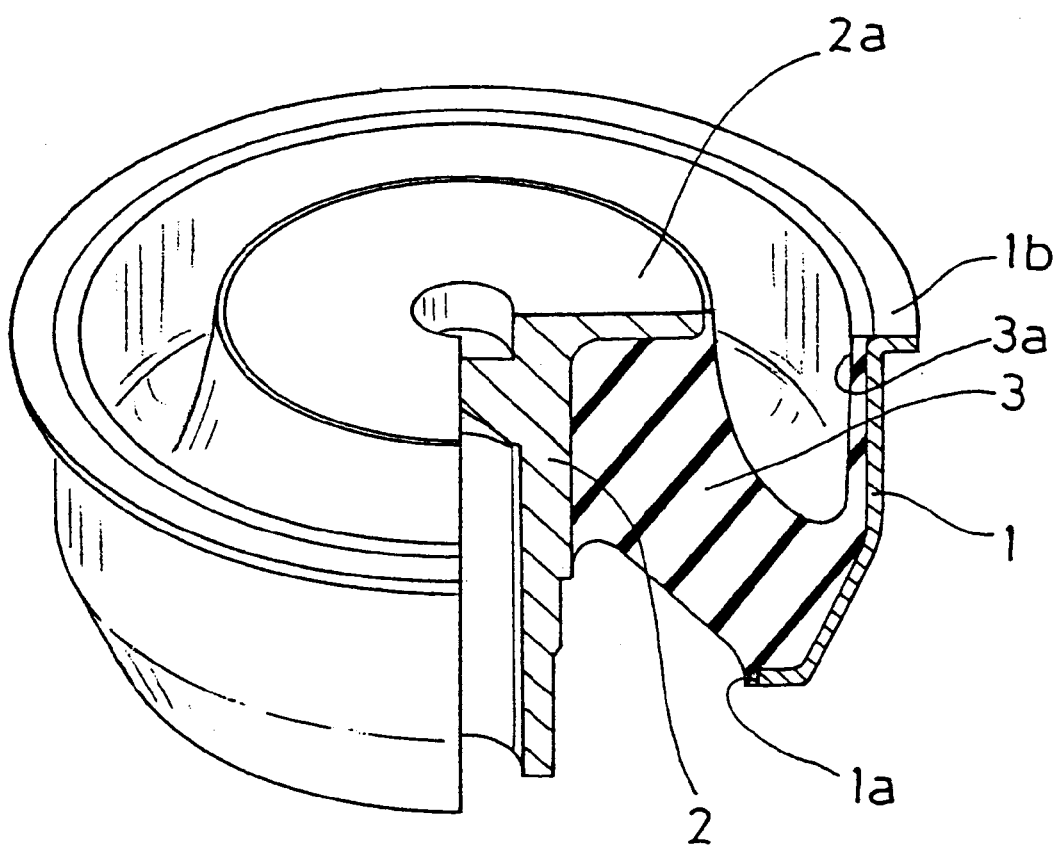
FIG. 3 is a partially cutaway view showing a cylindrical main body fitting, a vibration-isolating base and a boss fitting in FIG. 1.

FIG. 1 is a sectional view of a liquid-sealed antivibration device relating to this invention; FIG. 2 is a partially cutaway exploded perspective view showing a diaphragm and a partition element; FIG. 3 is a partially cutaway perspective view showing a cylindrical main body fitting, a vibration-isolating base and a boss fitting.

In the figures the reference numeral 1 designates a cylindrical main body fitting assuming an open bottom type of generally cup shape having an opening 1a at its bottom; 2 a boss fitting disposed in an axial center part inboard of the main body fitting 1 and having at its top a flange portion 2a of a large diameter which splays like an umbrella; and 3 a vibration-isolating base made of rubber elastomer secured hermetically by vulcanization adhesion means between a lower part of the cylindrical main body fitting 1, for example, an inner peripheral surface of its lower extremity and an upper part of the boss fitting 2. The cylindrical main body fitting 1 and the boss fitting 2 are connected through the vibration-isolating base 3, and the bottom opening 1a of the cylindrical main body fitting 1 is thus closed. The reference numeral 4 designates a diaphragm made of a rubber membrane connected to an upper extremity 1b of the cylindrical main body fitting 1 so as to cover the open top in an opposed manner to the vibration-isolating base 3. An interior room enclosed by these members, namely, the interior room between the vibration-isolating base 3 and the diaphragm 4 is sealed with a liquid.

In the interior room sealed with a liquid between the vibration-isolating base 3 and the diaphragm 4, a partition element 10 is placed thereby comparting the interior room into a main liquid chamber 6 on the boss fitting 2 side and a first subsidiary chamber 7 on the diaphragm 4 side. Both liquid chambers 6, 7 are put into communication with each other through a first orifice 8 for shake vibration provided in an outer circumferential part of the partition element 10.

The cylindrical main body fitting 1 is coupled and secured to a holding cylinder 52 assuming a generally cup form, which is provided at an upper side of a support side member 51 such as a frame on the vehicle body side, by press fitting means so as to be supported to the support side member 51, as illustrated. It is also naturally possible to couple and fix another supporting means to the outer periphery of the cylindrical main body fitting 1 thereby to support it.

As for the boss fitting 2, its top surface is located in the vicinity of the upper opening of the cylindrical main body fitting 1 whereas its lower end projects downwardly of the bottom opening 1a of the cylindrical main body fitting 1 and a bottom opening 52a of the holding cylinder 52. To the lower end of the boss fitting 2, a coupling member 53 of a vibration source side, e.g., engine is fastened with a bolt 54. The reference numeral 55 is a rubber portion attached to an outer circumference of the coupling member 53. The rubber portion 55 is adapted to abut on the bottom of the holding cylinder 52 so as to restrain a further large displacement upwardly. FIG. 1 indicates the state that any load such as engine is not exerted, but under loading the rubber portion 55 will be held to be spaced apart from the bottom of the holding cylinder 52.

The vibration-isolating base 3 assumes, as shown in FIG. 1, nearly an umbrella form which is larger in diameter and wall thickness at the lower side. Its upside is bonded by vulcanization to the underside of the flange portion 2a of the boss fitting 2 and the outer periphery of the shaft member whereas its lower end is bonded by vulcanization to an inner peripehery of the lower end of the main body fitting 1. In the inner periphery of the main body fitting 1, there is fitted a rubber layer 3a integral with the vibration-isolating base 3.

The foregoing diaphragm 4 is adhered by vulcanization at its outer periphery to a cylindrical member 5 for reinforcement and a lower end 5a of the cylindrical member 5 is fastened to the upper end 1b of the cylindrical main body fitting 1 by crimping. The diaphragm 4 has a predetermined radius of curvature and sectional length so as to be capable of following any hydraulic pressure change of the interior room without difficulty. In the inner periphery of the cylindrical member 5 there is fitted a cylindrical rubber portion 4a of a required thicknes, which is adhered by vulcanization to the diaphragm 4 integrally.

The partition element 10 includes, as shown in the figures, a partition plate member 11 provided with an elastic membrane 12 secured to the central opening 11a by vulcanization adhesion means and an orifice member 13 arranged on the first subsidiary chamber 7 side of the partition plate member 11 so as to contact with it in an opposed manner. The orifice member 13 is press fitted and received into the cylindrical member 5 through the cylindrical rubber portion 4a whereas the partition plate member 11 is secured at its outer peripheral edge 11b to be pinched in a crimped fastening portion of the upper end 1b of the cylindrical main body fitting 1 and the lower end 5a of the cylindrical member 5. The reference numeral 4b designates a positioning step on which the outer peripheral edge of the orifice member 13 abuts.

The orifice member 13 has a ring-form projecting portion 13b at the underside of a peripheral margin of a central plate section 13a. The ring-form projecting portion 13b is brought into contact with a marginal portion 12a of the elastic membrane 12 in an opposed manner so as to retain a sealing state, and the intermediate between the partition plate member 11 and the orifice member 13 is comparted into an inboard part and a ring-form outboard part. In the outboard part there is formed the first orifice 8 in a ring form, which is delimited by the outer peripheral portions of the orifice member 13 and the partition plate member 11 and the cylindrical rubber portion 4a, and further closed by a blocking wall portion 14 partly at its circumference.

The blocking wall portion 14 is formed by a part 13c of the orifice member 13 and a rubber portion 11c bonded by vulcanization to the partition plate member 11. The reference numerals 8a, 8b designate communication parts from the first orifice 8 to the main liquid chamber 6 and to the first subsidiary liquid chamber 7, respectively.

The space inboard enclosed by the central plate section 13a of the orifice member 13 and the upper surface of the elastic membrane 12 is formed as a second subsidiary liquid chamber 15 and an opening as a second orifice 16 for a muffled sound communicating from the first subsidiary liquid chamber 7 to the second subsidiary liquid chamber 15 is formed at the central plate section 13a of the orifice member 13

The opening as the second orifice 16, which the central plate section 13a of the orifice member 13 has, may be located anywhere in the central plate section 13a, but in order to secure stabilized characteristics while avoiding mutual interference of the communication part 8a with the first orifice 8 and the second orifice 16, the second orifice 16 is preferred to be made eccentric at an opposite side to the position of the communication part 8b of the first orifice 8, more preferably at a diametrically opposite side thereto. The position and opening diameter of the second orifice 16 may be set appropriately depending upon antivibration characteristics, etc.

In the aforementioned partition element 10, it is preferred particularly from the viewpoint of working the invention that the partition plate member 11 be prepared by adhering the elastic membrane 12 such as rubber by vulcanization to the central opening part 11a of a metal plate press formed because of easiness of production whereas the orifice member 13 be prepared by a formed or molded body from aluminum, its alloy or any other metal, ceramic material or synthetic resin because an intended dimensional precision is readily obtained. By this expedient, it is possible to enhance the dimensional precision in sectional area of the first orifice 8 formed by both members.

The liquid-sealed antivibration device of this invention thus constructed is used in a manner that the cylindrical main body fitting 1 is press fitted into the holding cylinder 52 on the support side member 51 on the vehicle body side to secure to it and concurrently, the coupling member 53 on the vibration source side such as engine is connected to the boss fitting 2 to support the engine or the like in a hanging manner. When a vibration from the engine or any other vibration source side is imparted in this supporting state, the vibration-isolating base 3 is deformed by that vibration whereby the sealed liquid flows through the first orifice 8 for shake vibration in the outer periphery of the partition element 10 or the second orifice 16 with an aperture on the central plate section 13a of the orifice member 13 between the main liquid chamber 6 and the first subsidiary liquid chamber 7 and between the first subsidiary liquid chamber and the second subsidiary liquid chamber. Owing to respective resonance vibrations of the first orifice 8 and the second orifice 16 it is possible to reduce effectively the dynamic spring rate in a wider frequency range than in the prior art.

Usually the first orifice 8 in the outer circumferential part is set in a frequency region of shake vibration so that vibration damping action may be effectively exhibited In addition to this, since the second subsidiary liquid chamber 15 is provided on the first subsidiary liquid chamber 7 side through the second orifice 16 adapted to a muffled sound, it is also possible to reduce the dynamic spring rate in a higher frequency region (100 to 200 Hz) to the frequency region for shake vibration (10 to 15 Hz). Consequently it is possible to perform the vibration damping effectively in a considerably wide frequency range and to enhance the effect of inhibiting noises.

By forming the first orifice 8 by the partition plate member 11 and the orifice member 13 and utilizing, as a material for the one of both members, namely, the orifice member 13, a formed or molded body of metal e.g., aluminum, its alloy, ceramic material or synthetic resin, it is possible to enhance the dimensional precision in sectional area of the orifice 8 and accordingly, to diminish the dispersion in characteristics.

Furthermore by locating the second orifice 16 to be eccentric at an opposite side to the communication part 8b of the first orifice 8, it is possible to avoid the mutual interference of both orifices 8, 16 and to stabilize the characteristics. In addition, where the aperture of the second orifice 16 is provided eccentrically, when the first subsidiary liquid chamber is contracted under diminished pressure, the central part of the diaphragm 4b, albeit abutting on the central plate section 13a of the orifice member 13, never chokes the second orifice 16, and the characterisitics are by no means impaired.

INDUSTRIAL APPLICABILITY

According to the liquid-sealed antivibration device of this invention thus far described, it is possible to enhance the dimensional precision of the orifices at the outer circumferential part corresponding to shake vibration and to reduce a dispersion in characteristics. Moreover its dynamic spring rate in a high frequency region can be diminished in comparison with the case resorting to one orifice and the elastic membrane and the device is excellent in the effect of reducing noise such as muffled sound. Therefore the liquid-sealed antivibration device is usable suitably for supporting and bearing an automotive engine or any other vibratory bodies in a vibration-proof manner.

What is claimed is:
1. A liquid-sealed antivibration device comprising a cylindrical main body fitting assuming a generally cup shape and having an open top, a boss fitting arranged inboard of the main body fitting in its axial center part, a vibration-isolating base of rubber elastomer interconnecting a lower part of the main body fitting and the boss fitting, a diaphragm of a rubber membrane connected to the main body fitting at its upper extremity so as to cover the open top, an interior room enclosed by the cylindrical main body fitting, the boss fitting, the vibration-isolating base, and the diaphragm and sealed with a liquid, and a partition element arranged between the vibration-isolating base and the diaphragm to compart the interior room into a main liquid chamber on the boss fitting side and a first subsidiary chamber on the diaphragm side, both chambers communicating through an orifice with each other, wherein the partition element includes a partition plate member having an elastic membrane at the central Part of the partition plate member and an orifice member disposed on the first subsidiary chamber side so as to contact with a peripheral edge portion of the elastic membrane in an opposed manner thereto; a first orifice of a generally ring shape is formed by the orifice member, an outer peripheral portion of the partition plate member and a cylindrical rubber portion linking to the diaphragm; a space enclosed by a central plate section of the orifice member and a top surface of the partition plate member is formed as a second subsidiary liquid chamber; the central plate section of the orifice member is formed with a single opening as a second orifice for a muffled sound communicating from the first subsidiary chamber to the second subsidiary chamber, wherein the second orifice is disposed at an eccentric position opposite to an opening of the first orifice, wherein the first orifice is formed in such that a part of its circumferential path enclosed by outer peripheral portions of the partition plate member and the orifice member and the cylindrical rubber portion is closed by a blocking wall portion; the blocking wall portion is formed by a part of the orifice member and a rubber portion adhered by vulcanization to the partition plate member.

2. A liquid-sealed antivibration device comprising:

a cup-shaped main body fitting having an open top, said main body fitting being adapted to be connected to a support supporting a vibration source;

a boss fitting arranged inboard of the main body fitting in its axial center part, said boss fitting being adapted to be connected to the vibration source;

a vibration-isolating base of rubber elastomer interconnecting the main body fitting and the boss fitting, said vibration-isolating base being deformed in accordance with vibrations from the vibration source via the boss fitting;

a diaphragm of a rubber membrane connected to the open top of the main body fitting to close the open top;

a partition plate member partitioning an interior room enclosed by the main body fitting, the boss fitting, the vibration-isolating base, and the diaphragm, into a main liquid chamber on the boss fitting side and a subsidiary chamber on the diaphragm side, wherein a liquid is sealed in the interior room, said partition plate member including an elastic membrane at its central part, said main liquid chamber and said subsidiary chamber communicating through a first orifice disposed at a periphery of the elastic membrane; and a central plate provided over the elastic membrane and partitioning the subsidiary chamber into a first subsidiary chamber on the diaphragm side and a second subsidiary chamber on the elastic membrane, said central plate having a single second orifice for muffled sound through which the first subsidiary chamber and the second subsidiary chamber communicate, wherein the liquid moves between the main liquid chamber and the first subsidiary chamber through the first orifice and between the first subsidiary chamber and the second subsidiary chamber through the second orifice as the vibration-isolating base is deformed due to vibrations from the vibration source, wherein an opening as the second orifice, which the orifice member has on its central plate section, is made eccentric at an opposite side to the location of a communication Part from the first orifice at an outer circumferential Part of the orifice member to the first subsidiary chamber, said liquid-sealed antivibration device further comprising a cylindrical member to which the diaphragm is bonded by vulcanization, said cylindrical member being fastened to an upper extremity of the main body fitting and covered with a rubber portion, wherein the central plate further comprises a blocking wall portion formed outward from the periphery of the central plate, said blocking wall attaching the cylindrical member and forming the first orifice in a ring shape between the blocking wall and the partitioning plate member, wherein the blocking wall has an opening through which the first subsidiary chamber and the first orifice communicate.

3. A liquid-sealed antivibration device comprising a cylindrical main body fitting assuming a generally cup shape and having an open top, a boss fitting arranged inboard of the main body fitting in its axial center part, a vibration-isolating base of rubber elastomer interconnecting a lower part of the main body fitting and the boss fitting, a diaphragm of a rubber membrane connected to the main body fitting at its upper extremity so as to cover the open top, an interior room enclosed by the cylindrical main body fitting, the boss fitting, the vibration-isolating base, and the diaphragm and sealed with a liquid, and a partition element arranged between the vibration-isolating base and the diaphragm to compart the interior room into a main liquid chamber on the boss fitting side and a first subsidiary chamber on the diaphragm side, both chambers communicating through an orifice with each other, wherein the partition element includes a partition plate member having an elastic membrane at the central part of the partition plate member and an orifice member disposed on the first subsidiary chamber side so as to contact with a peripheral edge portion of the elastic membrane in an opposed manner thereto; a first orifice of a generally ring shape is formed by the orifice member, an outer peripheral portion of the partition plate member and a cylindrical rubber portion linking to the diaphragm; a space enclosed by a central plate section of the orifice member and a top surface of the partition plate member is formed as a second subsidiary liquid chamber; the central plate section of the orifice member is formed with an opening as a second orifice for a muffled sound communicating from the first subsidiary chamber to the second subsidiary chamber, wherein the first orifice is formed in such that a part of its circumferential path enclosed by outer peripheral portions of the partition plate member and the orifice member and the cylindrical rubber portion is closed by a blocking wall portion; the blocking wall portion is formed by a part of the orifice member and a rubber portion adhered by vulcanization to the partition plate member.

4. A liquid-sealed antivibration device comprising:

a cup-shaped main body fitting having an open top, said main body fitting being adapted to be connected to a support supporting a vibration source;

a boss fitting arranged inboard of the main body fitting in its axial center part, said boss fitting being adapted to be connected to the vibration source;

a vibration-isolating base of rubber elastomer interconnecting the main body fitting and the boss fitting, said vibration-isolating base being deformed in accordance with vibrations from the vibration source via the boss fitting;

a diaphragm of a rubber membrane connected to the open top of the main body fitting to close the open top;

a partition plate member partitioning an interior room enclosed by the main body fitting, the boss fitting, the vibration-isolating base, and the diaphragm, into a main liquid chamber on the boss fitting side and a subsidiary chamber on the diaphragm side, wherein a liquid is sealed in the interior room, said partition plate member including an elastic membrane at its central part, said main liquid chamber and said subsidiary chamber communicating through a first orifice disposed at a periphery of the elastic membrane;

a central plate provided over the elastic membrane and partitioning the subsidiary chamber into a first subsidiary chamber on the diaphragm side and a second subsidiary chamber on the elastic membrane, said central plate having a second orifice for muffled sound through which the first subsidiary chamber and the second subsidiary chamber communicate, wherein the liquid moves between the main liquid chamber and the first subsidiary chamber through the first orifice and between the first subsidiary chamber and the second subsidiary chamber through the second orifice as the vibration-isolating base is deformed due to vibrations from the vibration source; and a cylindrical member to which the diaphragm is bonded by vulcanization, said cylindrical member being fastened to an upper extremity of the main body fitting and covered with a rubber portion, wherein the central plate further comprises a blocking wall portion formed outward from the periphery of the central plate, said blocking wall attaching the cylindrical member and forming the first orifice in a ring shape between the blocking wall and the partitioning plate member, wherein the blocking wall has an opening through which the first subsidiary chamber and the first orifice communicate.

* * * * *